United States Patent [19]

Katsobashvili et al.

[11] 3,755,202
[45] Aug. 28, 1973

[54] METHOD FOR REACTIVATION OF OXIDE CATALYSTS

[75] Inventors: Jakov Rafailovich Katsobashvili; Galina Mikhaliovna Belova, both of Moscow, U.S.S.R.

[73] Assignee: Institute Neftekhimivhrdkoho Sinteza Imeni A.V. Topchieva, Moscow, U.S.S.R.

[22] Filed: July 1, 1971

[21] Appl. No.: 159,042

Related U.S. Application Data

[63] Continuation of Ser. No. 728,909, May 14, 1968, abandoned, which is a continuation-in-part of Ser. No. 679,578, Oct. 31, 1967, abandoned, which is a continuation of Ser. No. 411,716, Nov. 17, 1964, abandoned.

[52] U.S. Cl. .............. 252/417, 252/416, 252/418, 423/650, 423/655
[51] Int. Cl. ..................... B01j 11/04, B01j 11/68
[58] Field of Search .................. 252/416, 417, 418, 252/420; 23/212 A, 213

[56] References Cited
UNITED STATES PATENTS

2,606,862  8/1952  Keith ........................... 252/416 X
2,640,009  5/1953  Montgomery et al. ......... 252/420 X
3,422,031  1/1969  Katsobashvili et al. ............. 252/417

OTHER PUBLICATIONS

Noller, Chemistry of Organic Compounds, (1956 Edition) Published by W. B. Saunders Co., Phila., Pa. page 56.

*Primary Examiner*—Patrick P. Garvin
*Attorney*—Waters, Roditi, Schwartz & Nissen

[57] ABSTRACT

A method for reactivation of oxide catalysts which have been deactivated by carbonaceous materials deposited thereon in the course of hydrocracking crude oils, coal tars or shale tars and for simultaneously obtaining technical grade hydrogen of 90–95 vol. % purity containing a maximum of 5 percent of carbon monoxide. Catalyst reactivation is effected by a steam-oxygen mixture having a steam-to-oxygen ratio of 7:1 to 10:1, preferably of 9:1, at a temperature of from 600° to 750°C, and under 20–30 atm pressure. Catalyst reactivation yields a gas consisting essentially of carbon dioxide and hydrogen and containing insignificant proportions of $H_2S$, CO and $CH_4$, the removal of $CO_2$ and $H_2S$ from the product gas being effected by absorption with water and an alkaline agent under a pressure of 20–30 atm. The method makes it possible to dispense with the CO conversion step.

6 Claims, No Drawings

METHOD FOR REACTIVATION OF OXIDE CATALYSTS

CROSS-REFERENCES TO RELATED APPLICATIONS:

This application is a continuation of application Ser. No. 728,909, filed May 14, 1968 which in turn is a continuation-in-part of application Ser. No. 679,578 filed Oct. 31, 1967 which is a streamlined continuation of application Ser. No. 411,716 filed Nov. 17, 1964, all now abandoned.

BACKGROUND OF THE INVENTION

1. Field of Application

The present invention relates to a process for regeneration of oxide catalysts deactivated with the carbonaceous matter deposited on said catalysts in the course of hydrocracking of crude oils or coal and shale tars accompanied by the production of technical-type hydrogen of 90 to 95 vol % purity, the carbon monoxide content being not over 5 vol %.

2. Description of the Prior Art

Known in the art are processes of regenerating catalysts deactivated with the carbonaceous matter deposited on them by burning off carbonaceous deposits with the aid of blow gas consisting of air and diluent gases. Suitable diluent gases are flue gas, nitrogen and sometimes steam as the most heat-absorbing agent. $CO_2$ and CO are formed in this process, the temperature and, hence, the rate of the process being controlled by varying the oxygen content in the blow gas (cf. U.S. Pat. No. 2,640,009 by Montgomery et al.).

Also known in the art are processes of regenerating heat-resistant contact materials, for example in the process of catalytic conversion of hydrocarbons in the presence of regeneration gases according to U.S. Pat. No. 2,606,862 to Keith, said regeneration process being effected through the use of a steam-oxygen mixture with a steam-to-oxygen ratio about 3:1 to 7:1 at high temperatures ranging from 870° to 1,200°C and not below 760°C, and at a pressure of about 21 to 45 atms.

Under these conditions the carbonaceous deposits interact with steam, yielding a regeneration product gas, consisting predominantly of carbon monoxide and hydrogen. The hydrogen-containing gas resulting in this process usually flows into the conversion zone to increase the quality and yields of valuable hydrocarbon products.

SUMMARY OF THE INVENTION

An object of the present invention is to obtain along with the regeneration of catalysts of hydrocracking process technical-type hydrogen of 90 to 95 vol % purity, sufficient for instance for the hydrocracking, with the carbon monoxide conversion stage being obviated.

Another object of the invention is to employ carbonaceous deposits of hydrocracking as the initial material for obtaining technical-type hydrogen.

Still another object of the invention is to simplify the process of regenerating catalysts of hydrocracking disactivated with the carbonaceous matter by providing a regeneration process with a zero thermal effect.

Said objects have been accomplished by the provision of a process for regenerating oxide catalysts of hydrocracking deactivated with the carbonaceous deposits in the course of hydrocracking oil, coal and shale tars with a simultaneous production of technical-type hydrogen featuring a 90 to 95 vol % purity and containing not over 5 vol % of carbon monoxide, said process, in conformity with the present invention, consisting in that through a bed of said catalyst a steam-oxygen mixture is blown, the steam-to-oxygen ratio in said mixture being 7:1 to 10:1, at a temperature of 600° to 750°C and a pressure of 20 to 30 atms. Under these conditions the resulting gas consists predominantly of $CO_2$ and $H_2$ with insignificant admixtures of $H_2S$, CO and $CH_4$; said gas is withdrawn from the regeneration zone to remove $CO_2$ and $H_2S$ therefrom by absorbing with water and an alkaline agent at a pressure of 20 to 30 atms.

The catalyst regeneration may be effected in a fixed, fixed-fluidized, circulating-fluidized or moving bed of the catalyst. Said steam-to-oxygen ratios make it possible for the process to be effected at said temperatures, at which on the said oxide catalysts of hydrocracking at a pressure of 20–30 atms hydrogen is formed mainly according to the equation $C + 2H_2O \rightarrow 2H_2 + CO_2$ and the reaction $C + H_2O \rightarrow CO + H_2$ proceeds at an insignificant rate.

Given hereinbelow are examples of effecting the process of regenerating oxide catalysts of hydrocracking according to the invention, listed in Table 1.

It can be seen from Table 1, that only the combination of the above-stated conditions, namely the nature and composition of the hydrocracking catalyst, that carries the carbonaceous matter, the temperature pressure, steam-to-oxygen ratio in the blow gas mixture provides, as a result of the steam- oxygen mixture interacting, when blown, with the carbon of this carbonaceous deposits formed in the course of hydrocracking of said initial hydrocarbon material, the obtaining of gas, consisting, predominantly, of $H_2$ and $CO_2$, which can be used directly, without additional purification from the carbon oxide, the amount of CO being insignificant.

If the amount of carbonaceous deposits in hydrocracking reaches, for example, 5 percent by weight of the initial material being processed, the regeneration yields hydrogen in the quantity of about 50 percent of that used in the hydrocracking process.

For comparison given hereinbelow is Table 2, in which examples 5 and 6 are presented of the realization of the process of regeneration of oxide hydrocracking catalysts under conditions beyond the scope of the present invention.

It can be seen from Table 2, that the amount of CO in the regeneration gas increases with an increase of temperature and a decrease in the steam-to-oxygen ratio in the blow gas mixture, as shown in Examples 5 and 6.

From Table 2 it follows, that the temperature of 750°C is the upper limit for obtaining technical-type hydrogen of 90 to 95 vol % purity, since at a temperature above 750°C the amount of CO in the product gas increases, and it becomes necessary to introduce a second stage for CO removal, that is, a CO conversion plant, especially under the conditions of the catalyst to be regenerated featuring a great amount of carbonaceous deposits.

Thus, the main positive effect of the method proposed herein resides in obtaining in one apparatus, simultaneously with and as a result of regeneration, a considerable amount of technical-type hydrogen of 90 to 95 vol % purity, with the stage of the carbon monoxide removal from the hydrogen-containing product gas being obviated.

TABLE 1

Examples of regeneration of hydrocracking oxide catalysts disactivated with carbonaceous matter deposited thereon in the process of hydrocracking of crude oil with the use of steam-oxygen mixture under conditions disclosed in the present invention.

| Serial No. of Example | 1 | 2 | 3 | 4 |
|---|---|---|---|---|
| Sample of hydrocracking catalyst | $Al_2O_3$ $Mo^+O_3$ | $Al_2O_3$ $Mo^+O_3$ | $Al_2O_3$ $Ni^+O$ | $Al_2O_3$ $Ni^+O$ |
| Carbonaceous matter content on the catalyst, wt.% | 16.7 | 12.6 | 16.7 | 13.2 |
| Reaction conditions: | | | | |
| Pressure, atm | 30 | 30 | 30 | 30 |
| Temperature, °C | 700 | 750 | 700 | 750 |
| Steam-to-oxygen molar ratio in blow gas | 9.0 | 9.8 | 10 | 10.2 |
| Regeneration Results: | | | | |
| Regeneration gas composition, vol % | | | | |
| $H_2S$ | 1.1 | 4.1 | 0.4 | 3.0 |
| $CO_2$ | 54.2 | 60.0 | 43.6 | 45.0 |
| $O_2$ | 0.1 | 0.1 | 0.1 | 0.1 |
| CO | 1.1 | 0.6 | 1.6 | 1.9 |
| $CH_4$ | 2.4 | 1.4 | 2.9 | 1.4 |
| $H_2$ | 41.1 | 33.8 | 51.4 | 48.6 |
| Composition of technical-type hydrogen (after removal of $CO_2$ and $H_2S$ from regeneration gas), vol %; | | | | |
| $H_2$ | 92.0 | 94.1 | 91.8 | 93.6 |
| CO | 2.4 | 1.7 | 2.9 | 3.6 |
| $CH_4$ and other admixtures | 5.6 | 4.2 | 5.3 | 2.8 |

TABLE 2

Examples of regeneration of hydrocracking oxide catalysts disactivated with carbonaceous matter deposited thereon in the process of hydrocracking of crude oil with the use of steam-oxygen mixture under conditions which are beyond the scope of the present invention, i.e., with the steam-to-oxygen ratio in the blow mixture below 7:1 (Example 6) and temperature above 750°C.

| Serial No. of Example | 5 | 6 |
|---|---|---|
| Sample of hydrocracking catalyst | $Al_2O_3$ $MoO_3^+$ | $Al_2O_3$ $MoO_3^+$ |
| Carbonaceous matter content on the catalyst, wt % | 16.2 | 11.3 |
| Reaction conditions: | | |
| Pressure, atm | 30 | 30 |
| Temperature, °C | 800 | 800 |
| Steam-to-oxygen molar ratio in flow gas | 9.2 | 6.5 |
| Regeneration results: | | |
| Regeneration gas composition, vol % | | |
| $H_2S$ | 0.9 | 2.2 |
| $CO_2$ | 43.2 | 50.4 |
| $O_2$ | 0.2 | 0.2 |
| CO | 6.0 | 7.5 |
| $CH_4$ | 3.6 | 1.9 |
| $H_2$ | 46.1 | 37.8 |
| Composition of technical-type hydrogen (after removal of $CO_2$ and $H_2S$ from regeneration gas), vol % | | |
| $H_2$ | 82.3 | 79.7 |
| CO | 10.7 | 15.8 |
| $CH_4$ and other admixtures | 7.0 | 4.5 |

We claim:

1. A method of regenerating hydrocracking oxide catalysts deactivated with carbonaceous matter deposited thereon in the course of hydrocracking of crude oils, coal tars or shale tars accompanied by the production of technical-grade hydrogen of 90 to 95 percent purity with a carbon monoxide content not over 5 vol %, said method comprising blowing a steam-oxygen mixture through a bed of said catalyst, the steam-to-oxygen ratio in said mixture being 7:1 to 10:1, at a temperature of 600°–750°C., and a pressure of 20–30 atm, the resulting gas consisting predominantly of $CO_2$ and $H_2$ with significant admixtures of $H_2S$, CO and $CH_4$, said gas being withdrawn from the regeneration zone, and removing $CO_2$ and $H_2S$ therefrom by absorption with water and an alkaline agent at a pressure of 20–30 atm.

2. A method according to claim 1 wherein the regeneration is effected in a fixed bed of the catalyst.

3. A method according to claim 1 wherein the regeneration is effected in a fixed fluidized bed of the catalyst.

4. A method according to claim 1 wherein the regeneration is effected in a circulating fluidized bed of the catalyst.

5. A method according to claim 1 wherein the regeneration is effected in a moving bed of the catalyst.

6. A method as claimed in claim 1 wherein the catalyst is composed of $Al_2O_3$ and $MoO_3$.

* * * * *